United States Patent Office 3,428,552
Patented Feb. 18, 1969

3,428,552
CYCLIC ADSORPTIVE SEPARATION PROCESSES
John N. Turnbull, Twickenham, and Ronald J. H. Gilbert, Staines, England, assignors to The British Petroleum Company Limited, London, England, a corporation of England
Filed Mar. 29, 1967, Ser. No. 626,834
Claims priority, application Great Britain, Apr. 6, 1966, 15,304/66
U.S. Cl. 208—310                18 Claims
Int. Cl. C10g 25/10; B01d 53/06

ABSTRACT OF THE DISCLOSURE

Cyclic vapour phase separation process, using a molecular sieve adsorbent, in which the desorption step is effected by directly condensing the effluent from the adsorbent bed to draw a vacuum.

---

Figure 1:
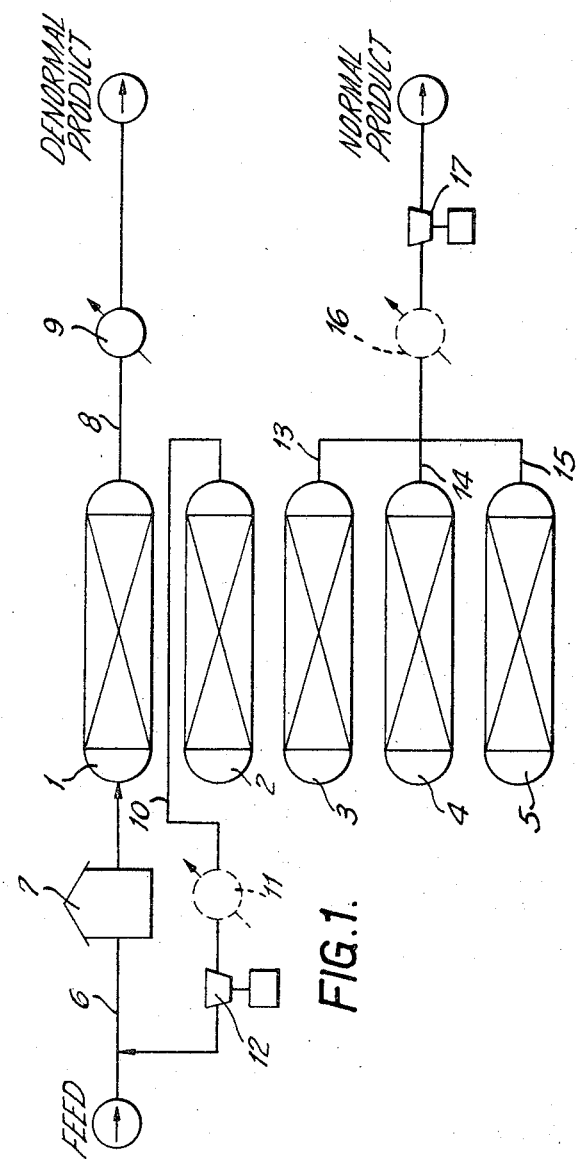

This invention relates to cyclic processes for separating by means of a solid selective adsorbent adsorbable components from mixtures thereof with non-adsorbable components.

It is well-known that solid adsorbent materials may be used to separate components of suitable mixtures. Examples of typical adsorbents which may be employed for various separations include silica gel, activated alumina, bauxite, activated charcoal, and crystalline aluminosilicate molecular sieves.

The process of the present invention is particularly applicable to the use of molecular sieves for resolving hydrocarbon mixtures and the process will be particularly described with reference to such a separation. More especially, the process is concerned with the separation of straight chain hydrocarbons from mixtures of the same with branched chain and/or cyclic hydrocarbons using molecular sieves. The scope of the invention is not, however, limited to the use of molecular sieves but is applicable to the use of any solid selective adsorbent material.

It is well-known that certain natural and synthetic zeolites have the property of preferentially adsorbing certain types of hydrocarbons. These zeolites, known as molecular sieves, have crystalline structures containing a large number of pores of uniform size. In different zeolites these pores may be from 4 A. to 15 A. in diameter, but in any one zeolite the pores will be of substantially uniform size.

It has previously been proposed to treat hydrocarbon mixtures with molecular sieves, for example it has been proposed to treat petroleum fractions ranging from gasoline to gas-oils and higher with molecular sieves having pore diameters ranging from 4 A. to 15 A. In order to separate straight chain hydrocarbons from branched chain and/or cyclic hydrocarbons a molecular sieve having pore diameters of 5 A. is suitable. Such a process may be used to recover a denormalised fraction, for example gasoline of higher octane number due to the removal of low octane normal paraffins. The adsorbed straight chain material may also be recovered if required.

For commercial feasibility it is usually necessary that separation processes using solid selective adsorbents should be cyclic and each cycle will comprise at least an adsorption step followed by a desorption step. In addition, an intermediate purge step may be employed in the cycle to remove material held between the adsorbent particles which material, if not removed, would decrease the purity of the product recovered during the desorption stage.

In adsorptive separation processes the major problem is posed by the desorption operation. For example, in the case of the separation of straight chain hydrocarbons, particularly, n-paraffins, by means of a 5 A. molecular sieve, the n-paraffins are readily adsorbed into the pores of the sieve but are less readily removed. Desorption may, however, be effected in a number of ways, for example by elution with a suitable displacement medium such as a lower boiling n-paraffin, or by partial evacuation of the chamber containing the adsorbent bed.

An example of a process which employs a vacuum purging and desorption technique is described in our U.K. Patent No. 1,026,116 which claims a process for separating straight-chain hydrocarbons from mixtures of the same with branched-chain and/or cyclic hydrocarbons, the mixtures boiling within the range $C_4$–450° C., for example 150–300° C., comprising contacting the mixture with a fixed bed of 5 A. molecular sieve in a first stage selectively to adsorb the straight-chain hydrocarbons, purging the sieve bed in a second stage to remove surface-adsorbed and interstitially held hydrocarbons from the sieve bed, and desorbing the adsorbed straight-chain hydrocarbons in a third stage, all three stages being conducted isothermally in the vapour phase, purging and desorption being effected by pressure variation alone.

The process claimed in our U.K. Patent No. 1,026,116 preferably operates at a temperature within the range 300–450° C., and particularly preferred temperatures for different range feedstocks are 325–375° C. for gasoline, 350–400° C. for kerosine, and 380–420° C. for gas oil. In the present specification the terms gasoline, kerosine, and gas oil have their normal meanings as used in the petroleum industry, i.e. they refer respectively to fractions boiling substantially within the ranges $C_4$–200° C., 150–300° C., and 200–450° C.

Purging is effected by reducing the pressure in the purging stage to an intermediate level below that of the adsorption stage, desorption being subsequently conducted by lowering the pressure in the desorption stage to a still lower level. The adsorption stage is desirably operated at a maximum pressure of 3–150 p.s.i.a., the preferred pressure again varying with feedstock being 40–100 p.s.i.a. for gasoline, 15–35 p.s.i.a. for kerosine, and 5–30 p.s.i.a. for gas oil. The intermediate purge pressure may be within the range 0.1–25 p.s.i.a., the preferred pressure also depending upon the actual boiling range of the feedstock. For example, when treating a gasoline fraction of average carbon number about $C_7$ boiling in the range $C_4$–180 C. a purge pressure range of 2–10 p.s.i.a. is preferred, while 1.0–3.0 p.s.i.a. is preferred for kerosine range fractions of average carbon number about $C_{11}$ boiling between 150–250° C., and 0.1–1.0 p.s.i.a. for gas oil fractions and higher boiling fractions ranging between 200–450° C. Similarly the desorption pressure is within the range 0.05–2.0 p.s.i.a., the preferred pressure varying according to the feedstock boiling range being preferably 0.2–2.0 p.s.i.a. for gasoline, 0.1–0.3 p.s.i.a. for kerosine and 0.05–0.3 p.s.i.a for gas oil fractions The durations of the three stages may be such that the desorption plus purge duration is a simple multiple of the adsorption duration Alternatively, and preferably, however, the durations of the adsorption and desorption are whole-number multiples of the purge. The purge duration should not exceed 3 minutes, 1–2 minutes being preferred. The adsorption and desorption periods may be, respectively, 1–5 preferably 1–2 minutes and 2–10 preferably 3–8 minutes.

The process is preferably operated using a number of fixed beds of sieve so that at any given time, one or more beds are adsorbing, purging and desorbing. The ratio of the numbers of beds respectively, adsorbing, pudging and desorbing at any given moment is preferably the same as the ratio of the durations of the adsorption, purge and desorption stages. This ratio may be 1:1:$n$ where $n$ is an integer between 1 and 6, 1:1:3 being preferred. Thus, for example, with a ratio of 1:1:3, a total of 5 sieve beds is required. A further additional bed may also be provided to permit periodic regeneration, e.g. by burning off, to remove carbonaceous deposits without interrupting the adsorption-purge-desorption cycle.

The feed rate to the adsorption stage is preferably 0.5–2.5 v./v./hr., particularly 1.0–2.0 v./v./hr.

According to a further preferred feature of the process of U.K. Patent No. 1,026,116, evacuation of the sieve bed during the desorption stage is conducted at least from both ends of the bed. By desorbing from both ends of the bed simultaneously in this manner as opposed to one end only, the yield of product can be increased considerably. It is believed that the main criterion determining product yield is the mean vapour pressure existing in the bed at the end of the desorption stage. Moderate increases in bed resistance, i.e. pressure drop along the bed, will limit the rate of desorption. Rates of desorption are proportional to the differential pressure existing between the inside and outside of the sieve pores. By desorbing from both ends of the bed the mean path of desorbed molecules traversing the bed is effectively halved and the mean pressure reduced and so rates of desorption will be higher and hence yields will be increased. In addition to evacuating from both ends, evacuation can be conducted also from intermediate positions along the bed, thereby further reducing the effective bed length. The effective bed length is preferably 1–15 feet especially 3–8 feet.

The direction of purging is also important. When processing gasoline range feedstocks purging should preferably be carried out in a direction co-current to that of the feed during the adsorption stage. Similarly when processing kerosine range feedstocks, purging should preferably be in a co-current direction. When processing gas oil range feedstocks however, it is not always possible to attain satisfactory product purity using co-current purging alone in which case simultaneous co- and counter-current purging is preferred. It is believed that an essential feature of the purging process is that a small amount of normal paraffins should be desorbed from within the sieve to displace non-normal material from the void spaces and from the surface of the sieve. In the case of gasoline and kerosine range normal paraffins some desorption of n-paraffins takes place at pressures above the recommended purge pressure and therefore this displacement is relatively easy.

Further, the non-adsorbed n-paraffins at the inlet end of the bed at the end of the adsorption stage are adsorbed at the unsaturated outlet end of the bed during the first part of a co-current purge, whereas with a counter-current and to a lesser extent with a co- and counter-current purge, these would pass straight out of the bed again. The yield and extraction efficiency of the process are therefore increased using a co-current purge. With gas oil range feedstocks however very little desorption of n-paraffin takes place until very low pressures are attained and therefore it is important that, as in the desorption stage, the mean vapour pressure throughout the bed should be relatively low by the end of the purge stage. Where simultaneous co- and counter-current purging is found necessary the valve on the purging system at the feed inlet end of the bed may usefully be opened after the valve on the purging system at the feed outlet end of the bed. In this way the feed hold-up material at the feed inlet end of the bed referred to above, is passed over the bed allowing the normal paraffins present in this hold-up material to be adsorbed in the unsaturated outlet end of the bed.

According to a yet further preferred feature of the process of U.K.Patent No. 1,026,116, the effluent recovered from the purge stage is recycled to the feed to the adsorption stage. The purge stage effluent invariably contains a proportion of straight-chain hydrocarbons which have been desorbed during purging. By recycling this effluent an increase in straight-chain product can be obtained. Alternatively the same yield can be obtained at a higher extraction efficiency by reducing the flow of fresh feedstock in proportion to the straight-chain hydrocarbon content of the purge effluent.

The present invention is particularly, but not exclusively, applicable to the process described in our U.K. Patent No. 1,026,116.

According to the present invention, in a cyclic vapour phase adsorption-desorption process for separating adsorbable components from mixtures thereof with non-adsorbable components by means of a fixed bed of a solid selective adsorbent, at least the desorption step is effected by drawing a partial vacuum on the adsorbent bed by directly condensing with a quench liquid the effluent vapours from the adsorbent bed during the desorption step.

In a preferred process wherein an intermediate purge stage is also employed, which purge stage is also operated on the vacuum principle, for example as described in our U.K. Patent No. 1,026,116, the purge stage may also be effected by the same means, viz. by direct condensation of the effluent from the adsorbent bed during the purge stage.

Hitherto, in adsorptive separation processes which have employed a vacuum desorption technique, the evacuation of the vessels has been effected by the use of one or more vacuum pumps. However, owing to the unusual conditions under which such vacuum pumps have to operate the design of suitable vacuum pumps is difficult.

In order to operate such a process economically it is necessary to employ more than one fixed bed of adsorbent in order to allow continuous operation. In a typical example of a molecular sieve process for separating n-paraffins from a petroleum derived feedstock, at any one time one bed of molecular sieve will be adsorbing, another bed will be undergoing purging, while one or preferably more than one further bed will be undergoing desorption. Furthermore, for efficient utilisation of the adsorbent it is essential to employ short cycle times.

The difficulties attendant upon the use of vacuum pumps for drawing the required partial vacua are illustrated with reference to an example of the process described in our U.K. Patent No. 1,026,116 as follows:

A hydrofined kerosine containing 22% wt. n-paraffins in the $C_9$–$C_{14}$ carbon number range was treated under the following conditions:

|  | Duration mins. | Temperature, ° C. | Pressure, p.s.i.a. |
| --- | --- | --- | --- |
| Adsorption | 1½ | 380 | 0.2 →25 |
| Purge | 1½ | 380 | 25 →1.5 |
| Desorption | 4½ | 380 | 1.5 →0.2 |

Using a feedrate of 1.5 vol./vol. of sieve/hour a yield of 5.8 lb./100 bbl. of sieve/hour of product containing 97% wt. n-paraffins was obtained.

The adsorber used to contain the molecular sieve was 8 feet long and it was purged from the adsorption exit and desorbed from both ends.

If the purge effluent is recycled with the feed the same yield of product can be obtained with 15% less feed.

Figure 2:
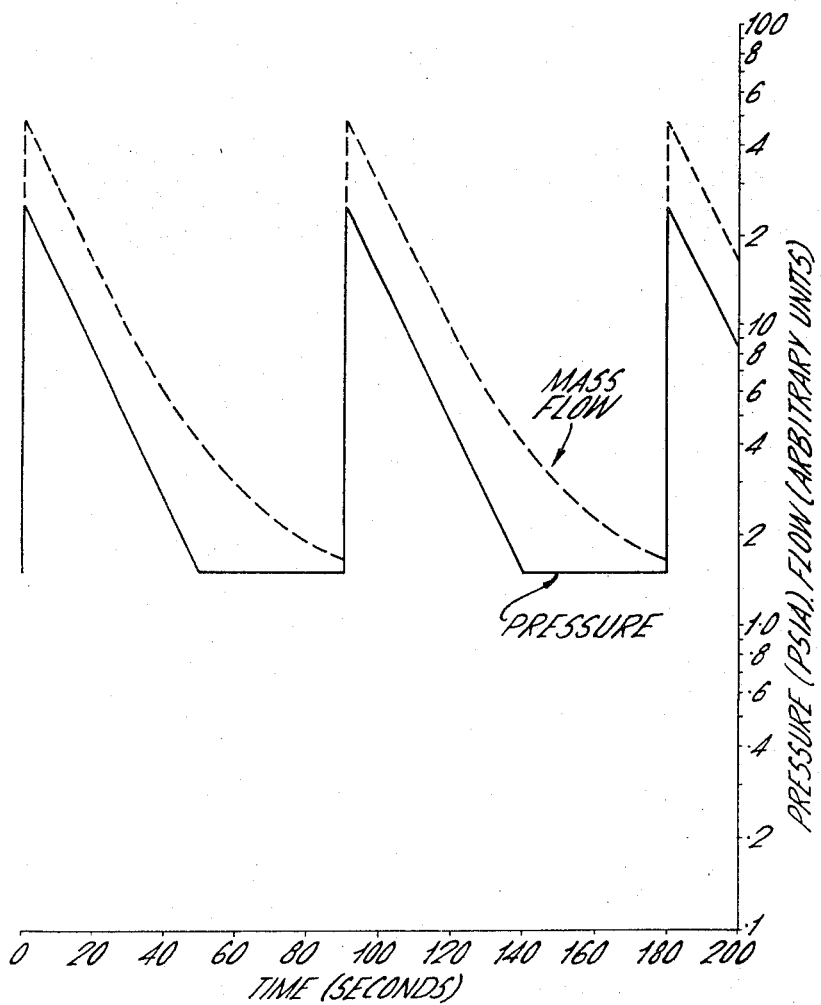
Figure 3:
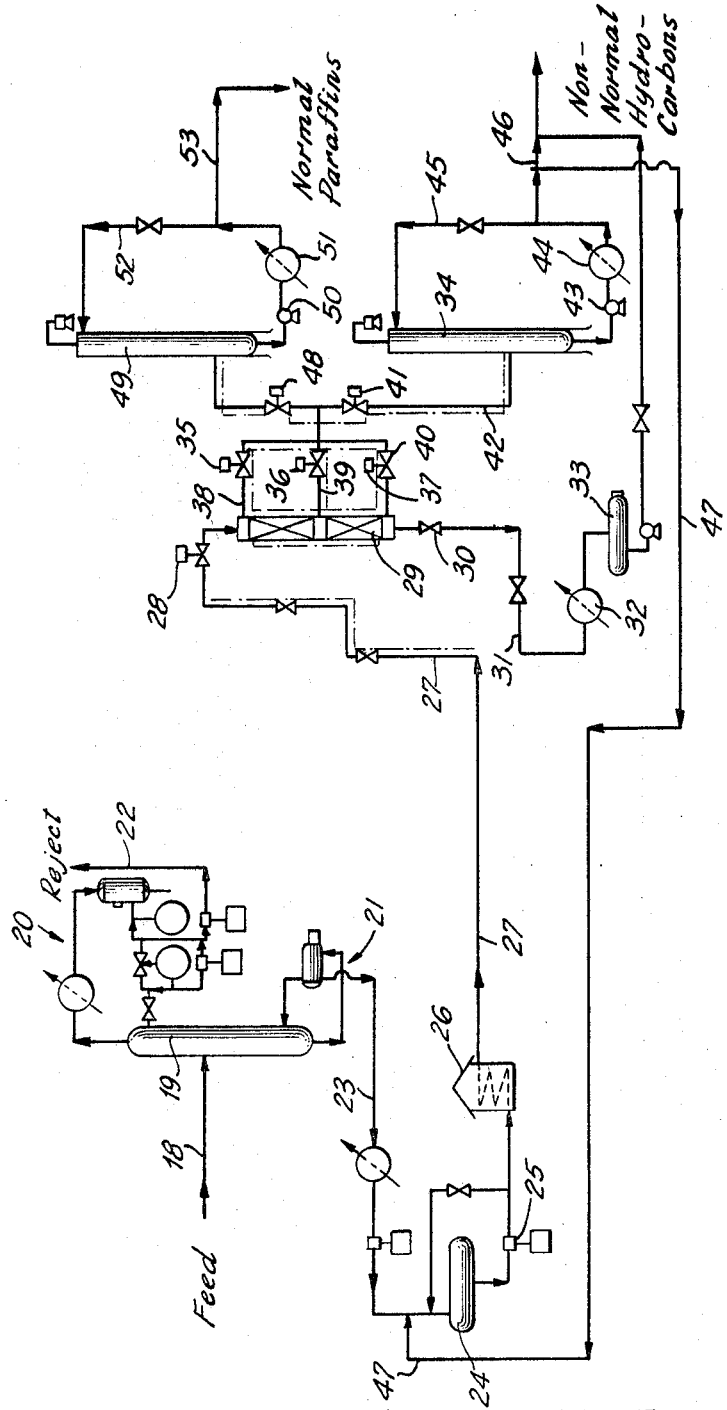
Figure 4:
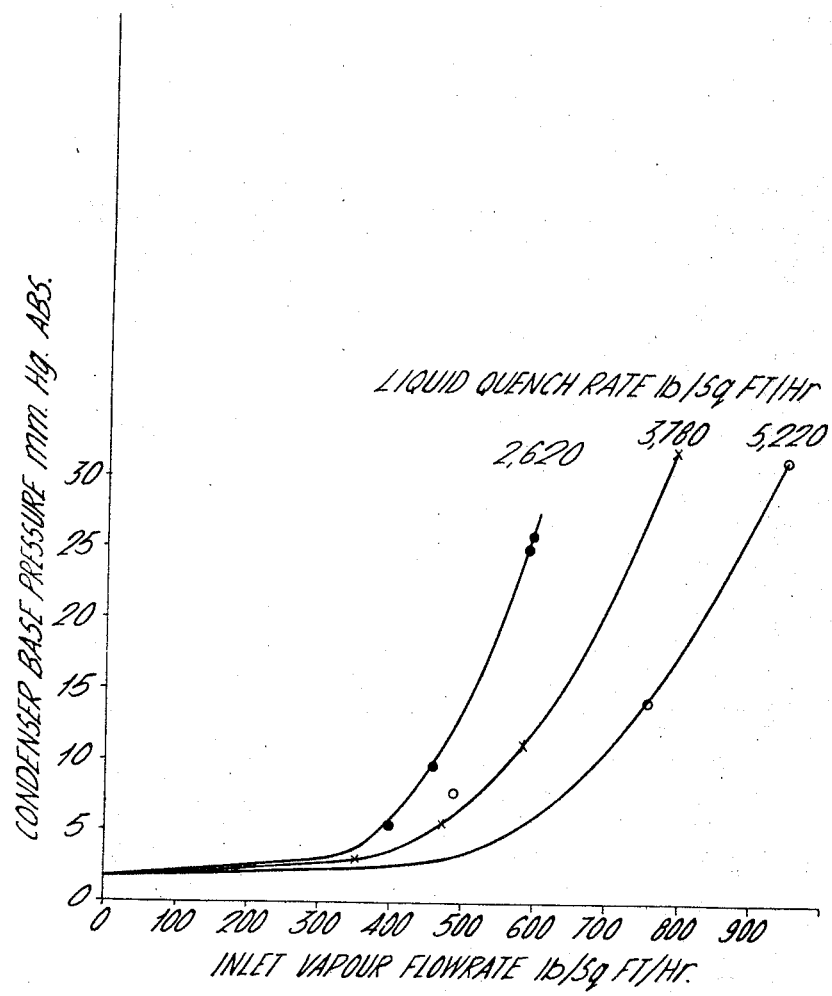

In the accompanying drawings:

FIGURE 1 is a simplified flow sheet for a commercial scale plant operatng under the conditions given above, FIGURE 2 is a graph showing pressure variation against time during purging, FIGURE 3 is a flow sheet of a single adsorber and associated direct condensers according to the invention, and FIGURE 4 is a graph showing the relationship between inlet vapor flow rate, quench liquid flow rate and pressure in a direct condenser.

In FIGURE 1, 5 absorbers (1 to 5) are used so that, by means of interconnecting pipe work and suitably placed valves (not shown) the process can be operated continuously. Absorber 1 is on the absorption stage of the cycle, feedstock being passed through line 6 and heater 7, to the adsorber. Product with a reduced content of normal paraffins is withdrawn through line 8 and cooler 9. Adsorber 2 is on the purge stage. A partial vacuum is drawn and purge effluent is sent through line 10, cooler 11 and pump 12 to the fed to absorber. Absorbers 3, 4 and 5 are on the desorption stage, a partial vacuum drawing normal paraffin product through lines 13, 14 and 15, cooler 16 and pump 17.

Vacuum pumps are used to evacuate the vessels for the purge and desorption stage. The suction pressure for the purge vacuum pump follows a 1½ minute cyclic pattern as does the flowrate. The preferred pressure profile is one in which the pressure at the exit of the adsorber is reduced fairly quickly to its final value of 80 mm. Hg abs. and then held there (see the accompanying FIG. 2). The corresponding effluent flowrate is also shown in FIG. 2. Since in general the mass flow through a given vacuum pump is proportional to the suction pressure it is impossible to select a vacuum pump which will reproduce both the pressure and flow profiles. Either the profiles have to be changed or control equipment provided to modify the vacuum pump's normal characteristics. Such a modification would result in a less efficient use of the adsorbent, or loss of pump efficiency.

The same considerations apply during the desorption stage with an additional complication when a five adsorber plant is designed. Each adsorber begins desorption at the purge stage final pressure of 1.5 p.s.i.g. and is rapidly evacuated so that its exit pressure reaches 0.2 p.s.i.a. where it is held while desorption continues. If there was only one vessel desorbing at any one time the vacuum pump could be designed to take advantage of the high pressure period at the beginning of desorption during which it could draw from the vessel a greater mass of effluent than later when the pressure has fallen to its final value. However, when three vessels are desorbing in parallel this is not possible without three separate vacuum pump systems.

In FIG. 1 coolers are shown tentatively between the adsorber system and the vacuum pumps. These would be necessary unless special vacuum pumps are used capable of withstanding the high temperature of the effluent vapours. These coolers are expensive as they have to be designed for very low pressure drops and also to provide adequate cooling for peak mass flowrates.

When by cooling the effluents to temperatures (e.g. 0° F.) such that the vapour pressure is less than the pressure required to effect the purge and desorption, the disadvantages inherent in the use of vacuum pumps can be overcome by the use of direct contact condensers. This situation obtains for example when treating hydrocarbon feedstocks boiling within the range $C_5$ and above.

FIGURE 3 is a flow sheet of a single adsorber system using direct contact condensers according to the invention. In the figure, feedstock is passed through line 18 to a distillation column 19 having a reflux system 20 and a reboiler 21. Light ends are rejected from the reflux system via line 22, and the desired feedstock passes from the reboiler through line 23 to drum 24, pump 25 and furnace 26.

Line 27 carries the heated feedstock to valve 28 and adsorber 29. Normal hydrocarbons are adsorbed and the non-normal hydrocarbons pass out through valve 30, line 31, cooler 32 and drum 33 as one product. At the end of the adsorption stage the purge stage is commenced. Valves 28 and 30 are closed and a partial vacuum is drawn in the adsorber by direct condenser 34. To achieve this valves 35, 36, 37 in lines 38, 39, 40 are opened and also valve 41 in line 42. Condensed cool purge effluent from a previous cycle which is passing down the direct condenser and recycling through pump 43, cooler 44 and line 45 cools and condenses the purge effluent thereby causing a partial vacuum. Condensed purge effluent is withdrawn as product from recycle line 45 in proportion as it is drawn from the adsorber and this effluent may be either added to the non-normal hydrocarbon product through line 46 or recycled through line 47 to the feedstock drum 24. At the end of the purge stage desorption is commenced. Valves 28 and 30 remain closed, valves 35, 36, 37 remain open, valve 41 is closed and valve 48 opened to connect the adsorber 29 with a second direct condenser 49. Condensed cooled normal paraffins from a previous cycle passing down the direct condenser and recycling through pump 50, cooler 51 and line 52 cool and condense the desorbed normal paraffins thereby causing a partial vacuum. The condensed normal paraffins are withdrawn as product through line 53 in proportion as they are drawn from the adsorber. At the end of the desorption a new cycle is commenced. Valves 48, 35, 36 and 37 are closed and valves 28 and 30 opened so that feed is passed again to the adsorber and non-normal hydrocarbon product withdrawn.

Direct condensation of effluents from the adsorbent beds in accordance with the present invention may be achieved by the use of any form of suitably designed direct condenser. For example, the condenser may take the form of a substantially unobstructed vessel into which effluent vapour is introduced at the lower part thereof and into which a quench spray is introduced at the upper part thereof. The vessel may, however, contain a baffle arrangement or suitable packing in order to improve the contact between the ascending vapour and the descending quench liquid. The pressure at the top of the condenser may be controlled by a suitable ejector system, for example a steam ejector, for removing traces of incondensible gases which would otherwise accumulate at the top of the vessel. In the design of a satisfactory condenser the aim is to provide maximum heat transfer between the vapour and liquid to ensure maximum condensation of vapour, coupled with minimum pressure drop in the condenser vessel.

Such a device has several advantages when used in conjunction with the cyclic process described above. In addition to its low cost and simplicity of operation, a direct contact condenser can handle a wide range of vapour flow-rates with only a small variation in pressure. This permits the pressure and flow-rate profiles to be adjusted according to the requirements of the process. Also, because the condenser can handle large flow-rates at a low pressure, it is possible to connect several vessels at various stage of any desorption to one condenser.

EXAMPLE 1

To illustrate this a series of experiments was performed in which kerosine vapour (boiling range 180°–240° C.) was fed to the base of a packed vertical tower down which cold liquid kerosine quench was falling. The hot vapour condensed as it passed up the tower. The liquid collected at the tower base was recycled through a cooler to the tower top, a proportion being drawn off to maintain a steady level in the tower base. At equilibrium incoming vapour and circulating quench were of the same composition.

Typical results are given in Table 1.

TABLE 1

| | | | |
|---|---|---|---|
| Quench flow, lb./sq. ft./h | 5,220 | 5,220 | 5,220 |
| Vapour flow (≡condensate flow), lb./sq. ft./h | 488 | 757 | 946 |
| Tower top pressure, mm. Hg | 2.3 | 2.4 | 7.2 |
| Tower base pressure, mm. Hg | 8.0 | 14.4 | 31.5 |
| Top vapour temperature, ° F. | 60 | 76 | 116 |
| Base condensation zone temperature, ° F. | 120 | 171 | 205 |
| Quench inlet temperature, ° F. | 70 | 80 | 89 |
| Vapour temperature at furnace outlet, ° F. | 751 | 746 | 750 |
| Vapour temperature at condenser inlet, ° F. | 535 | 586 | 610 |
| Base liquid temperature, ° F. | 140 | 184 | 219 |

Although these were steady state experiments they do however, illustrate the behaviour of the condensers under cyclic process conditions. This can be seen from FIGURE 4, which shows the variation in condenser base (vapour inlet) pressure with vapour handling capacity. Through the range of cold liquid quench rates shown the condenser will handle between 0 and 300–500 lb./sq. ft./h. of vapour with only a very small change in vapour inlet pressure. These are ideal characteristics because it means that the condenser will maintain a substantially constant pressure while being subjected to the large variations in flowrates which occur during each cycle. This has two main advantages over a vacuum pump:

(1) The preferred pressure profiile of a rapid reduction of adsorber outlet pressure can be achieved since the source vacuum is always at a very low pressure.

(2) The problems referred to above concerning multiple bed operation and the need to take advantage of the high pressure period to economise on vacuum pump size are eliminated.

Furthermore because the condenser is such an inexpensive piece of equipment the designer can size them so that they are effectively a vacuum ballast space which assists in dampening the sudden fluctuations which occur within a cycle.

EXAMPLE 2

A further series of experiments was carried but to test the validity of these conclusions under actual cyclic conditions and with particular reference to a process according to our U.K. Patent No. 1,026,116.

The process involves passing over a 5 A. molecular sieve a vaporised petroleum feedstock at a relatively elevated pressure in the adsorption stage until the sieve is substantially saturated with normal paraffins; reducing the pressure in the purge stage so that non-adsorbed material is removed; than reducing the pressure still further in the desorption stage to remove adsorbed normal paraffins. For a kerosine (boiling range 180°–240° C.) feedstock the process temperature was 700° F., the final pressures for each stage were 15 p.s.i.g., 80 mm. Hg absolute, and 10 mm. Hg absolute respectively, and the total time for operation of one cycle was 6 minutes. (Cf. FIG. 3.)

In these experiments hot kerosine vapour was fed to the top of the sieve bed in the adsorption stage of the cycle and it passed out under pressure control at the base of the adsorber. In the purge stage the adsorber was opened through any combination of three valves at its top, middle and base to the purge condensers, causing reduction of the adsorber pressure and transfer of material to the condenser. Similarly in the desorption stage, material was withdrawn through the same adsorber evacuation manifold to the desorption condenser.

The operating conditions employed together with the yields and purity obtained are given in Table 2 below.

TABLE 2

| | |
|---|---|
| Mean bed temperature at end of absorption stage °F | 685 |
| Mean bed temperature at end of desorption stage °F | 675 |
| Pressure at end of absorption stage p.s.i.g | 22 |
| Pressure at end of purge stage mm. Hg | 85 |
| Pressure at end of desorption stage mm. Hg | 4 |
| Total cycle duration minutes | 6 |
| Effective duration of absorption stage seconds | 90 |
| Effective duration of purge stage do | 90 |
| Effective duration of desorption stage do | 180 |
| Feed rate lb./h | 4350 |
| Cyclic yield to desorption condenser percent sieve wt | 0.58 |
| Cyclic yield to purge condenser do | 1.27 |
| Desorption quench normal paraffin content perecnt wt | 98 |

What we claim is:

1. A cyclic vapour phase process for separating adsorbable components from mixtures thereof with non-adsorbable components by means of a fixed bed of a solid selective adsorbent having an adsorption stage, a purge stage in which purging is effected by drawing a partial vacuum and a desorption stage in which desorption is effected by drawing a partial vacuum which is greater than that of the purge stage, wherein the partial vacua for the purge and desorption stages are obtained by directly condensing the effluent vapours from said stages with quench liquids.

2. A process as claimed in claim 1 wherein the partial vacua are drawn by passing the effluent vapours up condenser columns down which the quench liquids are caused to flow.

3. A process as claimed in claim 2 wherein the condenser columns are provided with means to improve the vapour-liquid contact selected from baffles and packing.

4. A process as claimed in claim 1 wherein the quench liquids comprise portions of the liquids drawn off from the bases of the condenser columns.

5. A process as claimed in claim 2 wherein any incondensible gases are removed from the tops of the condenser columns.

6. A process as claimed in claim 1 for separating straight chain hydrocarbons from mixtures of the same with branched-chain and/or cyclic hydrocarbons, the mixtures boiling within the range $C_4$–450° C., by means of a 5 A. molecular sieve.

7. A process as claimed in claim 6 which is conducted substantially iso-thermally.

8. A process as claimed in claim 6 wherein the adsorption stage pressures lies within the range 3–150 p.s.i.a., the purge stage pressure lies within the range 0.1–25 p.s.i.a. and the desorption stage pressure lies within the range 0.05–2.0 p.s.i.a.

9. A process as claimed in claim 6 wherein the feedstock boils within the gasoline range, the adsorption stage pressure lies within the range 40–100 p.s.i.a., the purge stage pressure lies within the range 2–10 p.s.i.a. and the desorption stage pressure lies within the range 0.2–2.0 p.s.i.a.

10. A process as claimed in claim 6 wherein the feedstock boils within the kerosine range, the adsorption stage pressure lies within the range 13–35 p.s.i.a., the purge stage pressure lies within the range 1.0–3.0 p.s.i.a. and the desorption stage pressure lies within the range 0.1–0.3 p.s.i.a.

11. A process as claimed in claim 6 wherein the feedstock boils within the gas oil range, the adsorption stage pressure lies within the range 5–30 p.s.i.a., the purge stage pressure lies within the range 0.1–1.0 p.s.i.a. and the desorption stage pressure lies within the range 0.05–0.3 p.s.i.a.

12. A process as claimed in claim 6 wherein the duration of the adsorption and desorption are whole-number multiples of the purge, the purge duration being not more than three minutes, the adsorption and desorption periods being respectively, 1–5 minutes, and 2–10 minutes and wherein the ratio of the numbers of sieve beds respectively adsorbing, purging and desorbing at any given moment is the same as the ratio of the duration of the adsorption, purge and desorption stages.

13. A process as claimed in claim 12 wherein the said ratio is 1:1:$n$ where $n$ is an integer between 1 and 6.

14. A process as claimed in claim 6 wherein desorption is conducted at least from both ends of the bed simultaneously and the effective sieve bed length during desorption is 1–15 feet.

15. A process as claimed in claim 10 wherein purging is carried out in a direction co-current to that of the feed during the adsorption stage.

16. A process as claimed in claim 11 wherein purging is carried out simultaneously co- and counter-currently to the feed direction.

17. A process as claimed in claim 16 wherein the valve on the purging system at the feed inlet end of the bed is opened after the valve on the purging system at the feed outlet end of the bed.

18. A process as claimed in claim 6 wherein the purge stage effluent is recycled to the feed to the adsorption stage.

References Cited

UNITED STATES PATENTS 2,978,407  4/1961  Tuttle et al. -------- 260—676

DELBERT E. GANTZ, *Primary Examiner.*

H. LEVINE, *Assistant Examiner.*

U.S. Cl. X.R.

260—676, 708